(12) United States Patent
Twardzik

(10) Patent No.: US 7,061,190 B2
(45) Date of Patent: Jun. 13, 2006

(54) CIRCUIT ARRANGEMENT AND OPERATING DEVICE FOR OPERATING LAMPS

(75) Inventor: Rene Twardzik, Traunreut (DE)

(73) Assignee: Patent Treuhand Gesellschaft fur elektrische Gluhlampen mbH, Munich (DE)

( * ) Notice: Subject to any disclaimer, the term of this patent is extended or adjusted under 35 U.S.C. 154(b) by 0 days.

(21) Appl. No.: 11/159,126

(22) Filed: Jun. 23, 2005

(65) Prior Publication Data

US 2005/0285545 A1 Dec. 29, 2005

(30) Foreign Application Priority Data

Jun. 29, 2004 (DE) .................. 10 2004 031 445

(51) Int. Cl.
G05F 1/00 (2006.01)
H05B 37/02 (2006.01)

(52) U.S. Cl. .............. 315/291; 315/362; 315/224; 315/226

(58) Field of Classification Search ........... 315/127, 315/128, 291, 299, 307, 362, 283, 209 R, 315/224–226; 363/20, 34, 37, 21.01, 21.02
See application file for complete search history.

(56) References Cited

U.S. PATENT DOCUMENTS

| 4,455,596 | A | * | 6/1984 | Baker ................ 363/21.08 |
| 4,800,323 | A | * | 1/1989 | Sikora ................ 315/219 |
| 5,461,286 | A | * | 10/1995 | Hirschmann ............. 315/205 |
| 5,498,934 | A | * | 3/1996 | Nilssen ................ 315/224 |
| 5,636,106 | A | | 6/1997 | Batarseh et al. ........... 363/16 |
| 6,037,720 | A | * | 3/2000 | Wong et al. ............ 315/291 |
| 6,088,247 | A | * | 7/2000 | Cheng ................ 363/56.11 |
| 6,388,397 | B1 | * | 5/2002 | Iwahori ............... 315/307 |
| 6,465,990 | B1 | * | 10/2002 | Acatrinei et al. .......... 323/222 |
| 6,690,122 | B1 | | 2/2004 | Weirich .............. 315/307 |
| 6,717,826 | B1 | * | 4/2004 | Noon et al. ............ 363/21.11 |
| 6,819,575 | B1 | * | 11/2004 | Batarseh et al. ........ 363/21.12 |
| 2003/0155872 | A1 | | 8/2003 | Weirich .............. 315/291 |
| 2003/0193302 | A1 | | 10/2003 | Huber et al. ........... 315/291 |
| 2004/0051479 | A1 | | 3/2004 | Weirich .............. 315/291 |
| 2004/0184291 | A1 | * | 9/2004 | Bachmaier et al. .......... 363/20 |

OTHER PUBLICATIONS

Copy of Great Britian Patent Office Search Report (dated Oct. 14, 2005; 3 pages total) for related Great Britian Patent Application No. GB0510903.8.

* cited by examiner

Primary Examiner—Thuy Vinh Tran

(57) ABSTRACT

The invention relates to circuit arrangements for operating lamps and to operating devices which contain such circuit arrangements. A first stage of a circuit arrangement according to the invention comprises a SEPIC known from the literature. The SEPIC provides a DC voltage which an inverter converts to a radiofrequency AC voltage for lamp operation. According to the invention, an electronic switch (S1) acts both in the SEPIC and in the inverter. Two diodes (D1, D2), which are connected into the supply line for the electronic switch (S1), prevent the SEPIC and the inverter from influencing one another.

10 Claims, 1 Drawing Sheet

CIRCUIT ARRANGEMENT AND OPERATING DEVICE FOR OPERATING LAMPS

FIELD OF THE INVENTION

The invention relates to circuit arrangements for operating lamps and to operating devices which contain such circuit arrangements. The term lamp in the present patent application encompasses apparatuses which are suitable for producing electromagnetic radiation having a wavelength of between 50 nanometers and 50,000 nanometers from electrical energy. Examples of such lamps are incandescent lamps, gas discharge lamps or light-emitting diodes. The present invention has the object of reducing costs by combining two stages of a circuit arrangement of this type.

BACKGROUND OF THE INVENTION

Circuit arrangements for operating lamps which essentially comprise two stages are widely used. A rectified system voltage is fed to a first stage which makes available a DC voltage for a second stage, this DC voltage being referred to in the literature as the intermediate circuit voltage. One function of the first stage is to draw a system current from the system voltage which is as proportional as possible with respect to the system voltage.

The second stage produces an AC output voltage from the intermediate circuit voltage, and this AC output voltage has a frequency which is substantially higher than the frequency of the system voltage. The AC output voltage is fed to a load circuit at a load circuit input. A lamp can be coupled to the load circuit. The load circuit essentially has the function of matching the AC output voltage to the requirements of the lamp. For example, the output impedance of the second stage or the amplitude of the AC output voltage needs to be matched to the lamp by means of a reactance network and/or a transformer.

For the first stage, a SEPIC-type converter (Single-Ended Primary Inductance Converter) is known, for example, from the specification U.S. Pat. No. 6,690,122 (Weirich). The SEPIC is a converter which contains only a first electronic switch. The SEPIC has the advantage that it can provide an intermediate circuit voltage, whose value can be set to be either above or below the value of the amplitude of the system voltage.

For the second stage, inverters having one or more electronic switches are known. The so-called half-bridge inverter which contains two electronic switches which are connected in series, the AC output voltage being applied to the junction of these two electronic switches, is widely known.

Furthermore, inverters are known for the second stage which contain only one electronic switch, such as flux converters, flyback converters or inverse converters.

The two-stage design of the circuit arrangement means a high degree of complexity as regards the number of electronic switches and the drive apparatuses required for them.

SUMMARY OF THE INVENTION

It is the object of the present invention to provide a circuit arrangement for operating lamps and an operating device having such a circuit arrangement which is less complex than a two-stage circuit arrangement.

This object is achieved by a circuit arrangement for operating lamps and an operating device having such a circuit arrangement which contains a SEPIC, the first electronic switch of the SEPIC also acting as an electronic switch for a downstream inverter. This is achieved by a first and a second diode which are each connected with their cathode to a first contact of the first electronic switch. The anode of the first diode is connected to a first node, to which, in the prior art, the first electronic switch is connected. The anode of the second diode is connected to a point in the inverter to which, in the prior art, a switch, connected to ground, of the inverter is referred. This point is generally the load circuit input.

Owing to the first and the second diode, current both from the SEPIC and from the inverter can flow into the switch. However, no current can flow from the SEPIC to the inverter, or vice versa. The first electronic switch can thus have a function both in the SEPIC and in the inverter without the SEPIC and the inverter influencing one another. Although the first electronic switch acts both in the SEPIC and in the inverter, only one drive apparatus is required for the first electronic switch.

BRIEF DESCRIPTION OF THE DRAWINGS

The invention will be explained in more detail below using exemplary embodiments with reference to drawings, in which.

Below, electronic switches are referred to by the letter S, diodes by the letter D, capacitors by the letter C, inductors by the letter L and nodes by the letter N, in each case followed by a number. The same references are also used throughout below for identical and functionally identical elements in the various exemplary embodiments.

DETAILED DESCRIPTION OF THE INVENTION

Figure 1:
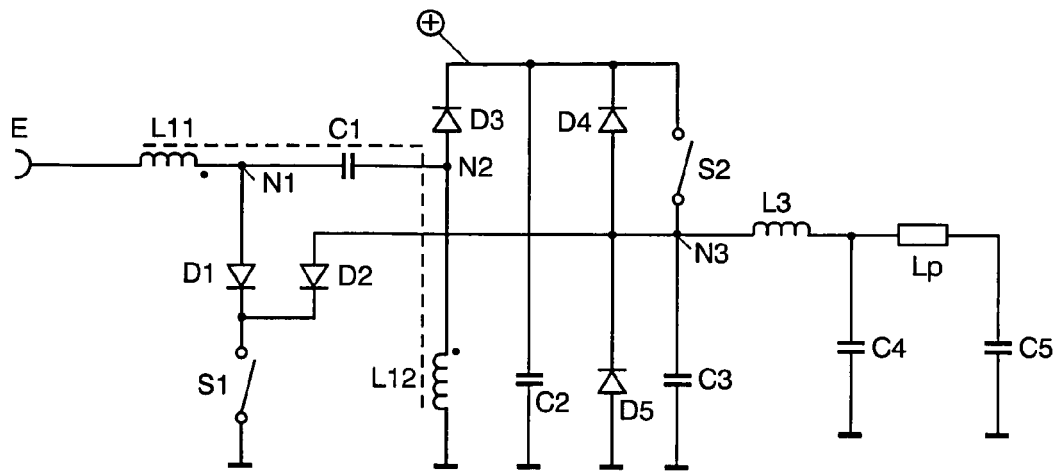
FIG. 1 shows an exemplary embodiment of a circuit arrangement according to the invention having a half-bridge inverter.

FIG. 1 shows an exemplary embodiment of a circuit arrangement according to the invention having a half-bridge inverter.

The following paragraph describes the topology of the SEPIC contained in the circuit arrangement:

A SEPIC-type converter which is contained in the circuit arrangement has an input E, which is referred to a ground and which can be connected to a rectified system voltage. Furthermore, the SEPIC has an input inductor L11 which on one side is coupled to the input and on the other side is coupled to a first node N1. Furthermore, the SEPIC has a first electronic switch S1 which is coupled, with a first contact, to the first node N1 via a diode D1 and, with a second contact, to the ground. Furthermore, the SEPIC has a first capacitor C1 which is firstly coupled to the first node N1 and secondly to a second node N2. Furthermore, the SEPIC has a third diode D3 which is coupled with its anode to the second node N2 and with its cathode to a plus potential +. Furthermore, the SEPIC has a second inductor L12 which is connected between the second node N2 and ground. Furthermore, the SEPIC has a second capacitor C2 which is connected between the plus potential + and ground.

The inductors L11 and L12 can be coupled, as is indicated by the dashed line. This coupling brings about ripple current compensation for an input current. This effect has been discussed many times in the literature.

A load circuit having a load circuit input N3 essentially comprises the series circuit comprising a third inductor L3 and a fourth capacitor C4, which is connected between the load circuit input N3 and ground. The series circuit comprising a lamp Lp and a fifth capacitor C5 is connected between the junction between L3 and C4 and ground. The series circuit comprising L3 and C4 matches an output impedance of the inverter to the lamp Lp. A current is thus impressed on the lamp Lp. C5 causes the current through the lamp Lp to have no DC component. The load circuit illustrated often serves the purpose of operating gas discharge lamps in the prior art.

According to the invention, a first diode D1 is connected between the first node N1 and the first contact of the first electronic switch S1 such that current can flow from the input inductor L11 to the first electronic switch S1. Furthermore, according to the invention a second diode D2 is connected between the first contact of the first electronic switch S1 and the load circuit input N3 such that current can flow from the load circuit to the first electronic switch S1.

A second electronic switch S2 is connected between the plus potential + and the load circuit input N3. S2 forms, via D2 and together with S1, a half-bridge inverter.

In each case a generally known freewheeling diode D4, D5 is connected in parallel with S2 and between the load circuit input N3 and ground. These freewheeling diodes can be dispensed with if they have already been integrated in the electronic switches S1, S2, as is the case with MOSFETs.

Figure 2:
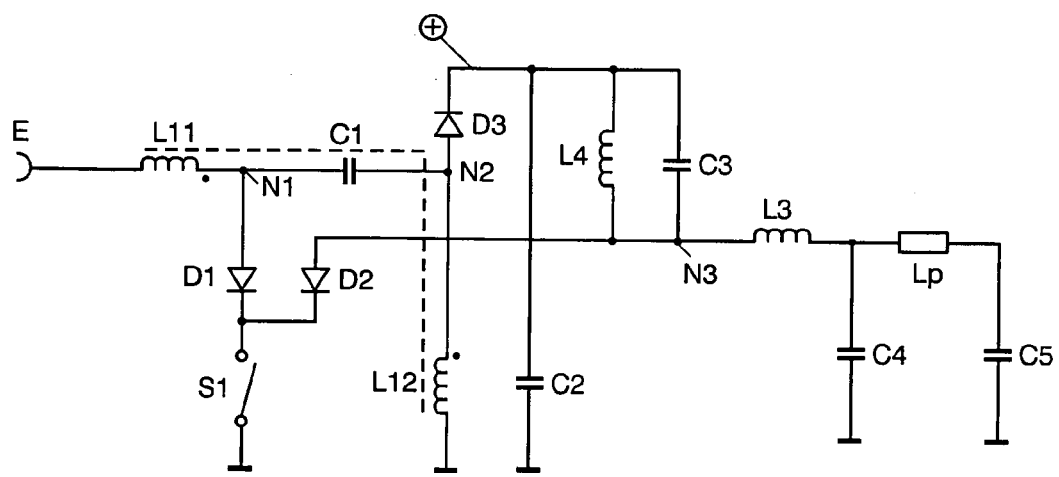
FIG. 2 shows an exemplary embodiment of a circuit arrangement according to the invention having a single-switch inverter (SSI).

In the exemplary embodiment, the load circuit input N3 is connected to a snubber capacitor C3. This snubber capacitor serves the purpose of relieving the switching load on the electronic switches S1, S2. If no switching load relief is required, or the parasitic capacitances of the electronic switches S1, S2 are sufficient for relieving the switching load, C3 can be dispensed with. C3 may be connected either to ground, as in the exemplary embodiment shown in FIG. 1, or to the plus potential +, as is shown in FIG. 2.

The electronic switches S1 and S2 close and open alternately. A square-wave voltage thus results at the load circuit input. In order to open and close, the electronic switches require a drive apparatus which is not shown in FIGS. 1 and 2. A lamp current can be set by the frequency at which the switches open and close. The switch-on time for the two switches should be essentially the same during operation of gas discharge lamps in order to prevent electrophoresis effects.

In summary, the operation of the exemplary embodiment shown in FIG. 1 is explained below: the circuit arrangement contains a first stage which is realized as a SEPIC. The electronic switch S1 acts as a switch for the SEPIC. The SEPIC is fed a rectified system voltage and makes available a DC voltage at C2. A half-bridge inverter comprising S1 and S2 converts this DC voltage to a square-wave voltage and makes it available to a load circuit.

According to the invention, S1 acts as a switch both for the SEPIC and for the half-bridge inverter. In order to prevent the SEPIC and the half-bridge from influencing one another, the diode D1 according to the invention is connected between S1 and the SEPIC, and the diode D2 according to the invention is connected between S1 and the half-bridge inverter.

FIG. 2 illustrates an exemplary embodiment of a circuit arrangement according to the invention having a single-switch inverter (SSI). It differs from the exemplary embodiment shown in FIG. 1 as follows:

The freewheeling diodes D4 and D5 and the electronic switch S2 are dispensed with. The snubber capacitor C3 is connected to the plus potential +. A fourth inductor L4 is connected between the plus potential + and the load circuit input N3.

In FIG. 2, there is no half-bridge arrangement, but S1 forms, together with L4, a single-switch inverter. Once S1 has opened, the voltage at S1 increases. If this voltage falls to zero before S1 closes again owing to a resonant design for the circuit arrangement, S1, together with L4, can be classed as a Class E converter cell. In order to provide a resonant design, in particular the value of L3 and C3 is to be selected such that the abovementioned condition for the voltage at S1 is maintained. Class E converter cells are known from the literature as low-loss converters.

As in FIG. 1, the diodes D1 and D2 according to the invention allow S1 to have a dual function. Firstly, it acts as a switch in the SEPIC, and secondly in the SSI.

A clock ratio is defined on the basis of the period of time during which S1 is switched on in relation to the period of time during which S1 is switched off. On the basis of the clock ratio, both the intermediate circuit voltage and the current through a connected lamp can be set. An intermediate circuit voltage can advantageously be selected to be either above or below the peak value of the connected system voltage. It is possible to regulate the lamp current by the period of time during which S1 is switched on depending on the current through the connected lamp.

The invention claimed is:

1. A circuit arrangement for operating lamps having the following features:
   a SEPIC-type converter having
      an input (E), which is referred to a ground and which can be connected to a rectified system voltage,
      an input inductor (L11), which on one side is coupled to the input and on the other side is coupled to a first node (N1),
      a first electronic switch (S1), which has a first and a second contact, the second contact being coupled to the ground,
   a load circuit, to which lamps can be coupled, having a load circuit input (N3),
characterized in that the circuit arrangement comprises the following features:
   a first diode (D1) which is connected between the first node (N1) and the first contact of the first electronic switch (S1) such that current can flow from the input inductor (L11) to the first electronic switch (S1),
   a second diode (D2) which is connected between the first contact of the first electronic switch (S1) and the load circuit input (N3) such that current can flow from the load circuit to the first electronic switch (S1).

2. The circuit arrangement for operating lamps as claimed in claim 1, characterized by the following features:
   a first capacitor (C1) is firstly coupled to the first node (N1) and secondly to a second node (N2),
   a third diode (D3) is coupled with its anode to the second node (N2) and with its cathode to a plus potential (+),
   a second inductor (L2) is connected between the second node (N2) and ground,
   a second capacitor (C2) is connected between the plus potential (+) and ground.

3. The circuit arrangement for operating lamps as claimed in claim 2, characterized in that a second electronic switch (S2) is connected between the plus potential (+) and the load circuit input (N3).

4. The circuit arrangement for operating lamps as claimed in claim 3, characterized in that the first and the second electronic switches (S1, S2) switch alternately on and off, and a switch-on time for the two switches is essentially the same.

5. The circuit arrangement for operating lamps as claimed in claim 2, characterized in that a fourth inductor (L4) is connected between the plus potential (+) and the load circuit input (N3).

6. The circuit arrangement for operating lamps as claimed in claim 5, characterized in that a third capacitor (C3) is connected between the plus potential (+) and the load circuit input (N3).

7. The circuit arrangement for operating lamps as claimed in claim 5, characterized in that the period of time during which the first electronic switch is switched on depends on the current through a connected lamp.

8. The circuit arrangement for operating lamps as claimed in claim 5, characterized in that the load circuit contains at least one third inductor (L3).

9. An operating device for lamps which contains a circuit arrangement as claimed in claim one.

10. The circuit arrangement for operating lamps as claimed in claim 6, characterized in that the period of time during which the first electronic switch is switched on depends on the current through a connected lamp.

* * * * *